United States Patent [19]

Poppelreuter

[11] Patent Number: 4,483,668

[45] Date of Patent: Nov. 20, 1984

[54] APPARATUS FOR FORMING MULTI-LAYER PLATE OF LIGNOCELLULOSE-CONTAINING PARTICLES PROVIDED WITH AT LEAST ONE BINDER

[75] Inventor: Klaus Poppelreuter, Springe, Fed. Rep. of Germany

[73] Assignee: Bison Werke Bahre & Greten GmbH & Co. KG, Springe, Fed. Rep. of Germany

[21] Appl. No.: 493,569

[22] Filed: Jun. 16, 1983

Related U.S. Application Data

[62] Division of Ser. No. 302,193, Sep. 14, 1981, Pat. No. 4,413,031.

[30] Foreign Application Priority Data

Sep. 15, 1980 [DE] Fed. Rep. of Germany ....... 3034772

[51] Int. Cl.$^{3}$ ................................................ B29D 7/00

[52] U.S. Cl. ..................................... 425/81.1; 19/302; 264/112

[58] Field of Search ......................... 156/67.2; 19/302; 241/69, 75; 264/112, 113, 108; 425/81.1, 83.1; 428/326, 357, 106, 114, 535, 537

[56] References Cited

U.S. PATENT DOCUMENTS

| | | | |
|---|---|---|---|
| 2,840,865 | 7/1958 | Reed | 19/302 |
| 3,299,478 | 1/1967 | Gaitten | 19/302 |
| 3,645,457 | 2/1972 | Greten | 241/73 |
| 3,963,400 | 6/1976 | Urmanov | 264/113 |
| 4,025,254 | 5/1977 | Arnold | 425/81.1 |
| 4,213,928 | 7/1980 | Casselbrant | 264/113 |
| 4,246,310 | 1/1981 | Hunt et al. | 428/326 |

*Primary Examiner*—Michael Ball
*Attorney, Agent, or Firm*—Max Fogiel

[57] ABSTRACT

An arrangement for making a multi-layer particle board having several layers of a pressed fleece with two outer cover layers of lignocellulose-containing slender oriented particles mixed with binder material. The particles are strewn to form a lower layer onto the fleece carrier, while they are simultaneously oriented. A middle layer is applied onto the lower cover layer, and an upper cover layer is strewn onto the middle layer under orientation of the particles. At least a part of the slender particles for the cover layers strewn prior to orientation in the opposite direction relative to the transport direction of the fleece carrier, so that in the region of the cover layer facing away from the center layer, the length of the slender particles increases with the distance from the center layer.

4 Claims, 2 Drawing Figures

APPARATUS FOR FORMING MULTI-LAYER PLATE OF LIGNOCELLULOSE-CONTAINING PARTICLES PROVIDED WITH AT LEAST ONE BINDER

This is a division of application Ser. No. 302,193 filed Sept. 14, 1981, now U.S. Pat. No. 4,413,031.

The invention relates to a plate according to the preamble to claim 1 and a method for its manufacture and an apparatus for carrying out the inventive method.

Known plates, which e.g. consist of three layers and whose particles in the coverlayers are always oriented in one direction, have excellent bending-strength characteristics. However, since in the continuous manufacture of such plates it must be taken into account that the percentage of the composition of the particles and their size varies over longer periods of time, a correspondingly large tolerance of the value of bending-resistance is also obtained.

There is further known a device for supplying the binder-coated particles (German Gebrauchsmuster No. 75 15 958). Also known is a device—and a method which can be carried out with it—for orienting the particles for the cover layers (German Pat. No. 27 34 403). As has been found, these methods and devices for carrying out the methods enable a good, but only relatively limited pass-through of particles to be oriented.

The purpose of the invention is to provide a plate according to the preamble of claim 1 with better, primarily more closely toleranced bending resistance, and a manufacturing method for such a plate as well as an apparatus for carrying out the method, which permit a greater throughput of particles to be oriented.

According to an inventive method, respectively an apparatus or a plate produced according to or with the same, this problem is solved by the subject matter of claim 1 respectively of the apparatus and the main method claim.

Thus, the basic solution of the invention resides in taking care that the length of the slender particles increases in a certain manner with their distance from the center layer, which results in an inhomogeneity—compared to the state of the art—of these slender particles of different length in the cover layers, which improves the bending resistance. Based upon this improved bending resistance the tolerances which occur during manufacture in the proportions, respectively, composition of the particles in the cover layers are of lesser importance so that overall a lesser tolerance width is obtained relative to fluctuations of the bending-resistance value in the inventive plates.

The inventive method for making a plate according to claim 1 is characterized in that the particles prior to their orientation are so deposit-strewn and/or air blown that with respect to their mass or their length—which has the same meaning—a gradual layering occurs in the single or multiple cover layers. Due to the deposit-strewing and/or air blowing prior to orientation the quantity of particles per unit surface area becomes smaller as compared to the method of the prior art. This results in a higher throughput of particles to be oriented, which is also true for the inventive apparatus.

Advantageous further embodiments and developments of the invention are characterized in the subclaims.

Further characteristics, details and advantages of the invention will become apparent from the following description of a preferred embodiment which is illustrated in the drawing.

Figure 1:
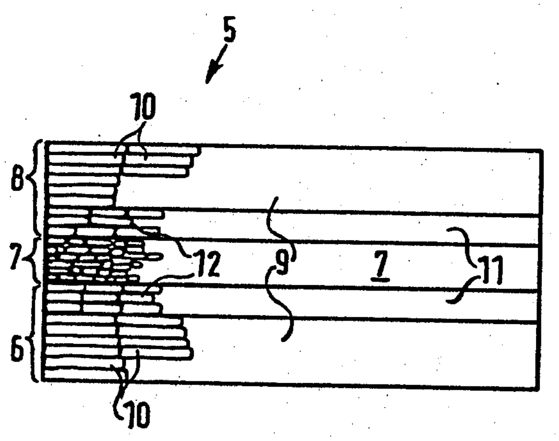
FIG. 1 shows the inventive plate in a diagrammatic cross-section.

The plate, which in FIG. 1 is designated in toto with 5 has—as diagrammatically indicated—a lower cover layer 6, a middle layer 7 and an upper cover layer 8, which latter corresponds to the lower cover layer 6 with respect to structure and layering.

In the cover layers 6 and 8—in a region 9 farthest removed from the middle layer 7—slender particles 10 are arranged gradually longitudinally oriented; the length of these particles increases with the distance from the center layer 7. In the intermediate range 11 located between the region 9 and the center layer 7 the narrow particles 12 which are shorter than the particles 10, are longitudinally oriented in gradual layering.

Figure 2:
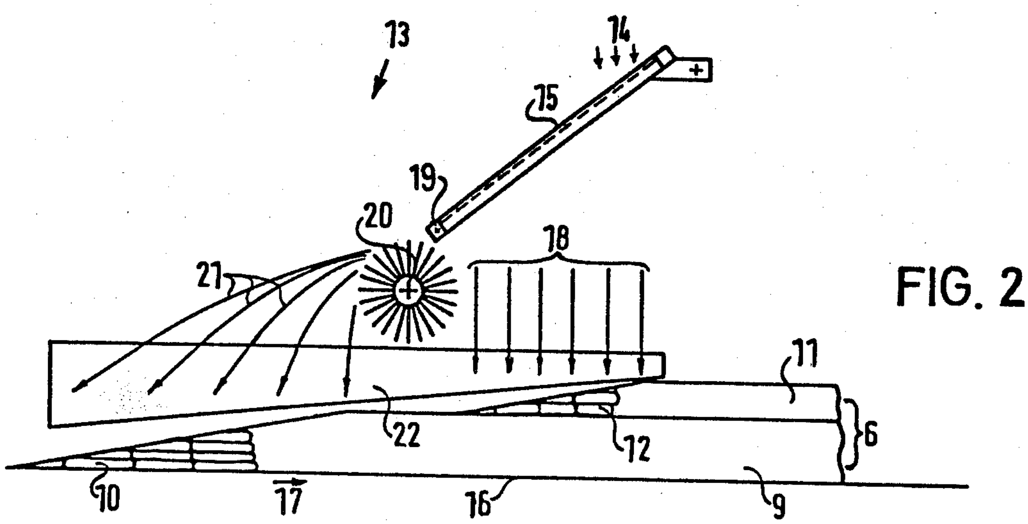
FIG. 2 shows an apparatus for carrying out the method of making a plate according to FIG. 1.

The apparatus 13 for making a plate according to FIG. 1 is illustrated in a diagrammatic cross-section in FIG. 2. The particles are fed at a feeding location 14 and impinge a screen 15 which is arranged above the fleece carrier which is designated in toto with 16; the screen is inclined downwardly counter to the transportation direction 17 of the fleece carrier. The screen 15 has a mesh width which is accommodated to the average length or width of the particles which overall have about the same degree of slenderness, so that the smaller particles can fall through about normally in the direction of arrow 18. The non-passing particles encounter at the downwardly inclined end 19 of the screen 15 a throw roller 20.

This throw roller 20 pulls apart and throw-strews the particles (according to the schematically shown throw parabolas 21) in accordance with their size respectively mass.

Both these vertically dropping particles passing the screen (arrow direction 18) and also the particles 21 encounter a known per se orientation device 22 arranged between screen 15 and roller 20 and the fleece carrier 16, of the type described for example in German Pat. No. 27 34 403.

The strewn particles 21 form the region 9 of the cover layer 6 which is furthest removed from the center layer 7, in which the length of the particles 10 increases with the distance from the center layer 7. The particles 12 form the intermediate range 11 between the range 9 and the center layer 7; the particles 12 are homogeneous relative to their length and size, i.e. without gradual layering relative to the spacing from the center layer, but are oriented in transport direction 17 of the fleece carrier 16. For strewing of the upper cover layer 8 a device is necessary which is mirror-symmetrical to the one in FIG. 2, in which the screen is inclined in transport direction 17 of the fleece carrier 16 and at the end of which is the rear end in transport direction 17 of the fleece carrier 16. The throw roller is arranged and rotates in the direction opposite to the throw roller 20.

In the device 13 according to FIG. 2 a portion of the slender particles for the cover layer 6 is so strewn and/or air blown prior to orientation, that in the region 9 remote from the center layer 7—which latter may e.g. be produced by pouring with or without longitudinal or transverse orientation—a layering is obtained as shown in FIGS. 1 and 2. The remaining part of the particles 12, which has passed through the screen, is deposited in homogeneous layering—but oriented—as intermediate range 11 of the cover layer 6.

I claim:

1. Apparatus for making a plate having several layers of a pressed fleece having two outer cover layers of preferably lignocellulose-containing slender oriented particles mixed with at least one binder material, comprising: respective cover layer strewing station for two outer cover layers; orientation means arranged therebelow, and a station for pressing the fleece; each said cover layer strewing station having an inclined screen with a throwing roller at the lower end thereof for the formation of the region homogeneous relative to particle length and size and a region of the cover layer facing away from the center layer, wherein the length of the slender particles increases with the distance from the center layer, longest particles being subjected to the strongest propulsion when scattered by said throwing roller so that the longest particles travel the greatest distance.

2. Apparatus according to claim 1, and means for making the cover layer wherein, said inclined screen has a mesh width dependent on the size and length of the slender particles.

3. Apparatus according to claim 2, wherein said orientation means extends in throw direction of said roller below the roller and extends also under the screen.

4. Apparatus according to claim 2, wherein said screen is swingably driven.

* * * * *